(12) United States Patent
van Pol et al.

(10) Patent No.: US 11,767,944 B2
(45) Date of Patent: Sep. 26, 2023

(54) MOUNT ASSEMBLY, A SYSTEM AND A METHOD FOR COLLECTING FLUID CONDUIT DATA

(71) Applicant: INGU Solutions Inc., Calgary (CA)

(72) Inventors: Anouk van Pol, Calgary (CA); Huibert Aren Bogerman, Ees (NL); Johannes Hubertus Gerardus van Pol, Calgary (CA)

(73) Assignee: INGU Solutions Inc., Calgary (CA)

( * ) Notice: Subject to any disclaimer, the term of this patent is extended or adjusted under 35 U.S.C. 154(b) by 1102 days.

(21) Appl. No.: 16/424,643

(22) Filed: May 29, 2019

(65) Prior Publication Data
US 2019/0368665 A1 Dec. 5, 2019

Related U.S. Application Data

(60) Provisional application No. 62/677,455, filed on May 29, 2018.

(51) Int. Cl.
*F16L 55/48* (2006.01)
*F16L 55/40* (2006.01)
(Continued)

(52) U.S. Cl.
CPC .............. *F16L 55/48* (2013.01); *F16L 55/26* (2013.01); *F16L 55/40* (2013.01); *F17D 5/06* (2013.01); *G01B 7/281* (2013.01); *G01B 7/293* (2013.01); *G01B 7/30* (2013.01); *G01M 3/005* (2013.01); *G01M 3/246* (2013.01); *G01M 3/2823* (2013.01); *F16L 2101/30* (2013.01)

(58) Field of Classification Search
CPC ........... F16L 55/48; F16L 55/40; F16L 55/26; G01M 3/005; G01M 3/246; G01M 3/2823; G01B 7/281
See application file for complete search history.

(56) References Cited

U.S. PATENT DOCUMENTS

| | | | | |
|---|---|---|---|---|
| 4,945,775 A | * | 8/1990 | Adams | .................... F16L 55/26 73/865.8 |
| 7,798,023 B1 | | 9/2010 | Hoyt et al. | |
| 9,836,945 B2 | * | 12/2017 | Kramer | ................ G08B 21/187 |

FOREIGN PATENT DOCUMENTS

| | | |
|---|---|---|
| EP | 0089738 B1 | 8/1986 |
| EP | 3336505 A2 | 6/2018 |
| WO | 2016159434 A1 | 10/2016 |

OTHER PUBLICATIONS

Webpage article "LORD Corporation Responds to Market Gap with Rugged Inertial Sensors for Demanding Environments" Apr. 27, 2018, https://www.microstrain.com/support/news/lord-corporation-responds-market-gap-rugged-inertial-sensors-demanding-environments (Year: 2018).*

(Continued)

*Primary Examiner* — Paul M. West
(74) *Attorney, Agent, or Firm* — Own Innovation; James W. Hinton

(57) ABSTRACT

Provided is a device, method, and inspection system for collecting data in a fluid conduit. The inspection system includes a pig, wherein the pig is defined by at least a front end and a read end, the rear end being distally opposed to the front end along a longitudinal axis, a mount assembly secured to the rear end of the pig; and at least one sensor device removably coupled to the mount assembly.

18 Claims, 16 Drawing Sheets

(51) Int. Cl.
    *G01B 7/28*     (2006.01)
    *G01M 3/00*     (2006.01)
    *G01M 3/24*     (2006.01)
    *G01M 3/28*     (2006.01)
    *F17D 5/06*     (2006.01)
    *G01B 7/293*    (2006.01)
    *G01B 7/30*     (2006.01)
    *F16L 55/26*    (2006.01)
    *F16L 101/30*   (2006.01)

(56) References Cited

OTHER PUBLICATIONS

Duisterwinkel et al., "Sensor Motes for the Exploration and Monitoring of Operational Pipelines", IEEE Transactions on Instrumentation and Measurement, Mar. 2018, pp. 655-666, vol. 67, No. 3.
European Patent Office, Extended European Search Report for EP Patent App. No. 19020345.5, dated Oct. 22, 2019.

\* cited by examiner

550

MOUNT ASSEMBLY, A SYSTEM AND A METHOD FOR COLLECTING FLUID CONDUIT DATA

TECHNICAL FIELD

The embodiments disclosed herein relate to sensing and data collection, and, in particular, to an apparatus and method for collecting fluid conduit data.

INTRODUCTION

A sensor device such as a sensor mote typically refers to a relatively small sensor with its own energy storage for sensing fluid parameters.

United States Patent Publication Nos. 20180177064 and 20180171783, which are incorporated herein by reference, describe a free-floating sensor mote for deployment inside of a fluid conduit (i.e. a pipeline) to collect and analyze fluid data.

A particular challenge faced by the use of free-floating sensors is their limited application to fluid conduits carrying liquids. In particular, free-floating sensors may be of limited use in fluid conduits carrying non-liquid media such as in gas pipelines, and which cannot otherwise carry the 'free-floating' sensor, or propel the sensor forward through the conduit.

It may be desirable to have a data collection device that can be deployed in a fluid conduit, whether the media in the conduit is a gas, a liquid, or a mixture of a gas and liquid.

It is also desirable to have a device which can be deployed to inspect the inside of a fluid conduit. In particular, the device may be able to determine the ability for a pig to pass through the fluid conduit. Pigging in the context of pipelines refers to the practice of using devices known as pigs to perform various maintenance operations, such as pipeline inspection.

In some cases, it may be desirable to have a device that can provide a first screening of a fluid conduit to determine whether traditional high resolution inline inspection tools, such as a caliper or a Magnetic Flux Leakage (MFL) tool, can be run through the fluid conduit without getting stuck at small radius bends, or bends which are in close proximity, or as a result of changes to an inner diameter of the fluid conduit (i.e. due to deformations, or a change in the fluid conduit type, or changes to the inner wall thickness of the fluid conduit).

Accordingly, there is a need for an alternative method for collecting fluid conduit data as described herein.

SUMMARY

Provided is an inspection system for collecting data in a fluid conduit, the inspection system comprising: a pig, wherein the pig is defined by at least a front end and a read end, the rear end being distally opposed to the front end along a longitudinal axis; a mount assembly secured to the rear end of the pig; and at least one sensor device removably coupled to the mount assembly.

The sensor device may include any of a tri-axial gyroscope and a tri-axial accelerometer. The sensor device may detect bends in the fluid conduit. The sensor device may measure angles and direction of one or more bends in the fluid conduit. The sensor device may measure radii of one or more bends in the fluid conduit.

The sensor device may include an outer capsule. The outer capsule may include a first capsule portion and a second capsule portion that together enclose an interior compartment of the sensor device. The first capsule portion and a second capsule portion may be separated to provide access to the interior compartment.

Provided is a mount assembly for removably attaching a sensor device to a pig. The mount assembly includes a base plate for securing to the pig; at least two column members extending from the base plate along a first axis, wherein the at least two column members are spaced from each other at a first distance along a second axis; a plate collar for securing to the sensor device; wherein the plate collar is attachable to the at least two column members; and wherein each column member includes a connector for connecting the column member to the plate collar.

Provided is a mount assembly for removably coupling a sensor device to a pig. The mount assembly includes a base plate secured to the pig; at least two column members extending normally from the base plate along a first axis, wherein each column member terminating at a top face, the top face being distally opposed to the base plate along the first axis, and wherein the top face, of each column member, includes a top opening in communication with a threaded bore, the threaded bore extending at least partially into the column member along the first axis, and wherein the at least two column members being distally spaced from each other at a fixed distance along a second axis, the second axis being perpendicular to the first axis; a plate collar secured to the sensor device, wherein the plate collar includes at least two apertures extending therethrough, the apertures distally spaced on the plate collar at the fixed distance, and wherein the plate collar is further configured to be movable into an aligned position relative to the at least two column members, the aligned position being defined by: an alignment of the at least two apertures, of the plate collar, with the top openings, of the at least two column members respectively, along the first axis; and wherein the plate collar is in abutting engagement with the top face of each column member; and at least two fasteners operable to secure the plate collar to the at least two column members, wherein, in the aligned position, the at least two fasteners are receivable through the at least two apertures of the plate collar respectively, and into threaded engagement with the threaded bore of each column member.

The sensor device may include an outer capsule that includes a first capsule portion and a second capsule portion that together enclose an interior compartment of the sensor device, and can be separated to provide access to the interior compartment. The plate collar may be secured between the first capsule portion and the second capsule portion when the first and second capsule portions enclose the interior compartment.

Provided is a method for collecting data in a fluid conduit. The method includes inserting an inspection system inside of the fluid conduit, wherein the inspection system comprises: a pig; and at least one sensor device removably attached to the pig; measuring rotational data using the inspection system; and retrieving the inspection system from the fluid conduit.

Provided is a method for collecting data in a fluid conduit, the method includes inserting an inspection system inside of the fluid conduit, measuring rotational data using the inspection system, and retrieving the inspection system from the fluid conduit.

Measuring rotational data using the inspection system includes measuring rotational data using a triaxial gyroscope of the sensor device.

The method may further include determining the presence of one or more bends in the fluid conduit using the rotational data.

The method may further include determining an angle of one or more bends in the fluid conduit using the rotational data.

The method may further comprise measuring acceleration data using an accelerometer of the sensor device.

The method may further include determining radii and direction of one or more bends in the fluid conduit using the acceleration data and the rotational data.

The method may further comprise measuring pressure data using a pressure sensor of the sensor device.

The method may further include determining the presence of a bend section having one or more closely spaced bends in the fluid conduit using one or more of the acceleration data, the rotational data, and the pressure data.

The method may further include determining the presence of a deformation in the fluid conduit using the pressure data.

The method may further include determining a change to the inner wall thickness of the fluid conduit, or a change to the type of fluid conduit, using the pressure data.

The inspection system may include a sensor device removably attached to a pig using a mount assembly secured to the pig.

Before inserting the inspection system into the fluid conduit, the sensor device is attached to the mount assembly.

After retrieving the inspection system from the fluid conduit, the sensor device is detached from the mount assembly.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1A:
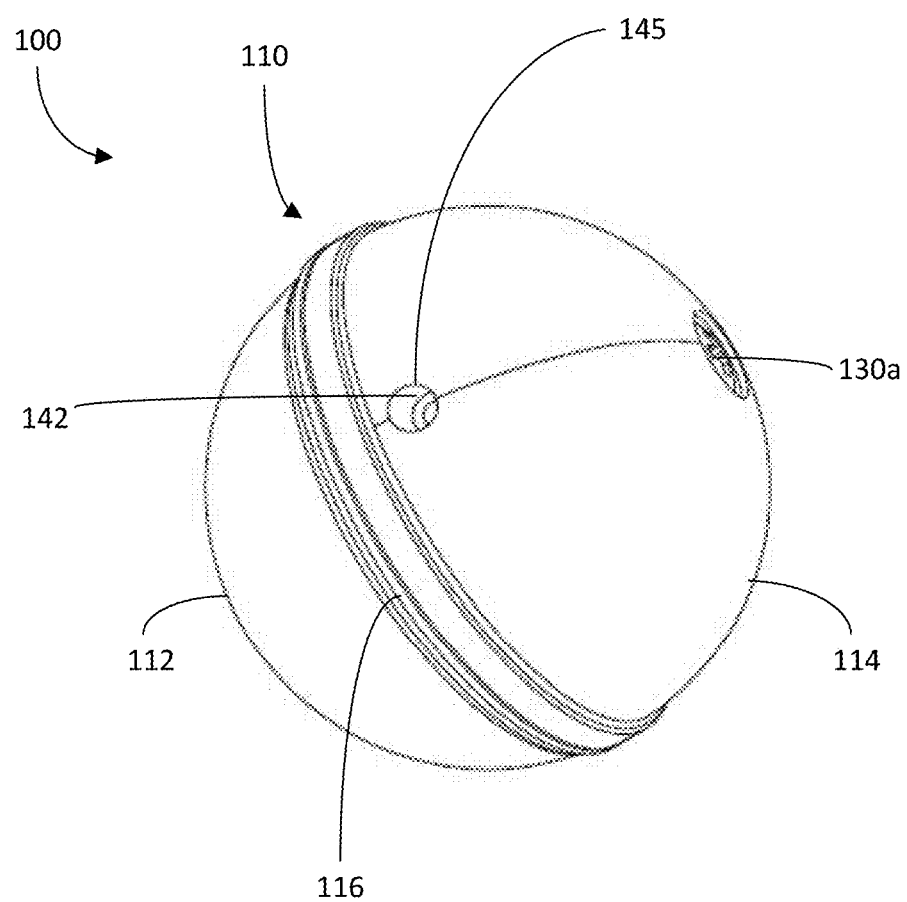
FIG. 1A is a perspective view of an example sensor device, in accordance with an embodiment.
Figure 1B:
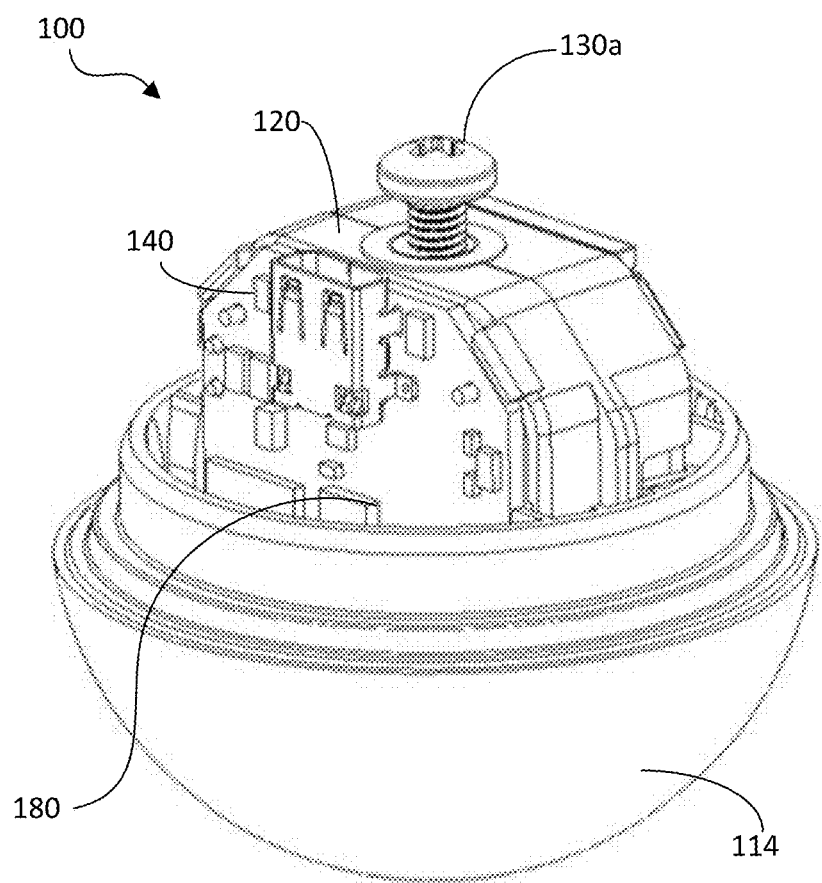
FIG. 1B is a perspective view of the sensor device of FIG. 1A, with an outer portion removed to expose an interior compartment of the sensor device.

Reference is now made to FIGS. 1A and 1B, illustrating therein a sensor device 100 for sensing fluid conduit properties in accordance with an embodiment.

In particular, the sensor device 100 may include an outer capsule 110 for providing fluid-tight containment to an interior compartment. The outer capsule 110 may also provide pressure resistivity to the interior compartment.

The outer capsule 110 includes a first capsule portion 112 and a second capsule portion 114 that meet at a capsule seam 116. The first and second capsule portions 112, 114 enclose the interior compartment. The first and second capsule portions 112, 114 can be separated to provide access to the interior compartment. The sensor device 100 includes fasteners e.g., 130a that close the first capsule portion 112 with the second capsule portion 114. In some embodiments, the sensor 180 may also include an external-facing sensor such as a pressure sensor 142, installed in an aperture 145 in the outer capsule 110. The dimensions, physical properties, and other characteristics of the sensor device 100 may be as described in U.S. patent application Ser. Nos. 15/843,296; 15/843,310.

In reference now to FIG. 1B, showing a perspective view of the sensor device of FIG. 1A, with an outer portion removed to expose an interior compartment of the sensor device.

The sensor device 100 may include at least one sensor 180 for sensing fluid conduit properties. According to an embodiment, the sensor 180 may include at least a tri-axial gyroscope for measuring angular rotation of the sensor device 100. As detailed further below, the tri-axial gyroscope may be used for detecting bends in a fluid conduit, as well as the angle and radius of each bend in the fluid conduit. The sensor 180 may also include other sensors for measuring, for example, linear motion, pressure, temperature, magnetic field, acoustics, etc.

The sensor device 100 also includes a sensor platform 140. The sensor 180 is provided on the sensor platform 140. The sensor platform 140 provides support to other components that support the operation of the sensor 180. The sensor platform 140 may be provided on a printed circuit board with soldered components. The sensor platform 140 maybe mounted onto an inner frame 120.

The sensor device 100 may include a top fastener and conductor 130a and a bottom fastener and conductor (not shown) for activating the sensor 180 to sense fluid conduit data. The fasteners 130a may also be used to close the first capsule portion 112 to the second capsule portion 114, as shown for example, in FIG. 3D (fasteners and conductors 334a, 334b). In other embodiments, the sensor device may be closed using only one fastener, and the sensor device may be activated by a magnet.

Figure 2:
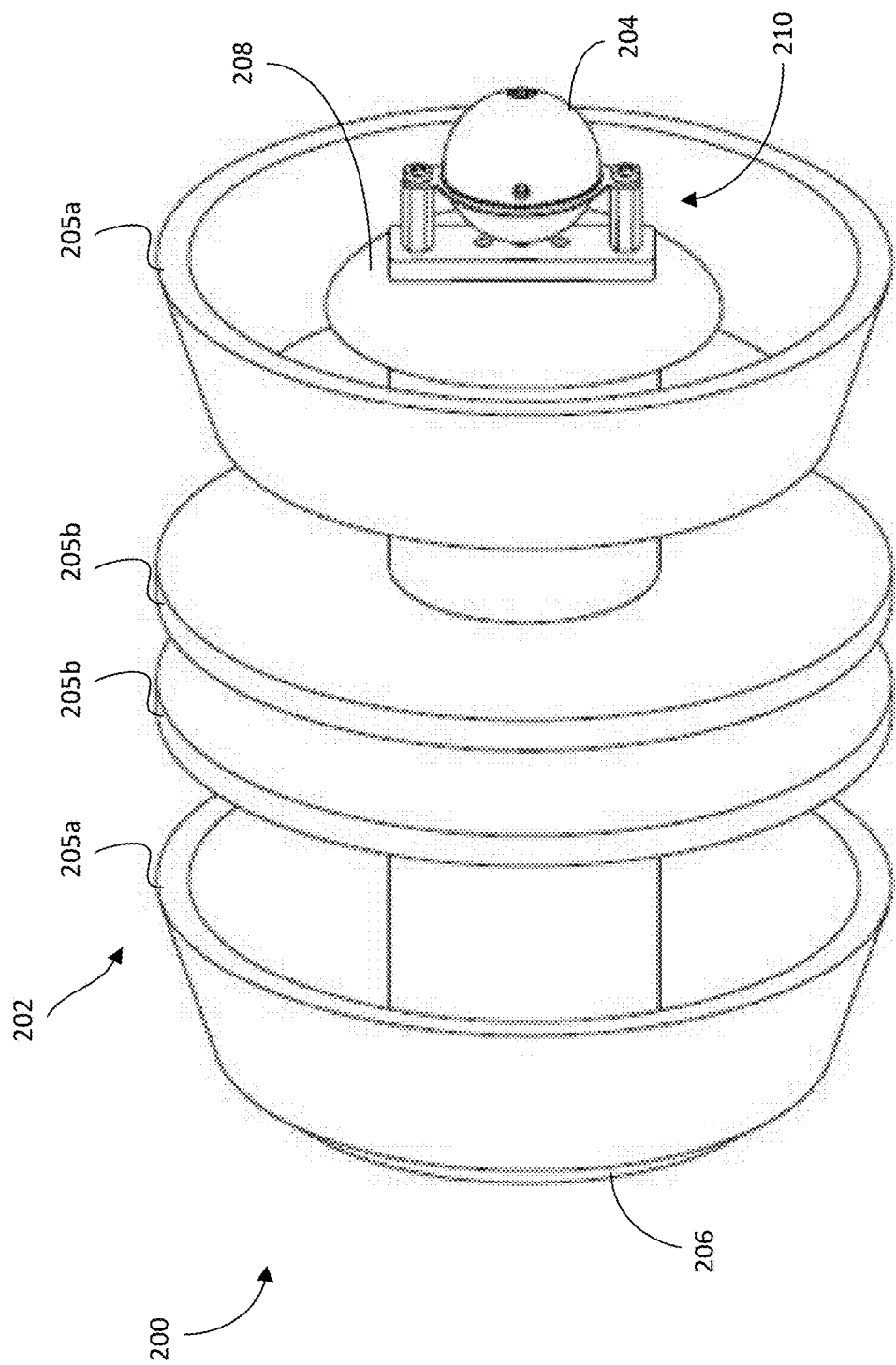
FIG. 2 is a perspective view of an inspection system, in accordance with an embodiment.

Reference is now made to FIG. 2, illustrating therein an inspection system 200, in accordance with an embodiment. The inspection system 200 includes a cleaning pig 202, a sensor device 204, and a mount assembly 210 for mounting the sensor device 204 to the cleaning pig 202.

The cleaning pig 202 may have a forward-end 206, and a rear-end 208. In some cases, the cleaning pig 202 is propelled forward through a fluid conduit by a force applied by a fluid to the rear-end 208. In other cases, when there is no fluid in the fluid conduit, the cleaning pig is pulled forward through the fluid conduit by a winch attached to the forward-end 206.

The word fluid, as used herein, includes fluid in liquid, gas and/or mixture of liquid and gas phases.

The cleaning pig 202 can be used to clean a fluid conduit, or in the case of a gas pipeline, to remove unwanted liquids from the fluid conduit. To this end, the cleaning pig 202 may include forward and rearward cups 205a, and a series of parallel discs 205b. Fluid, inside of the fluid conduit, may apply forward force or pressure to the cups 205a so as to propel the pig forward through the fluid conduit. The discs 205b engage the interior surface of the fluid conduit. In particular, as the cleaning pig 202 travels through the fluid conduit, the discs 205b may skid along the interior surface of the fluid conduit to clean the interior surface, or alternatively, to push forward liquid disposed in the conduit.

The cleaning pig 202 may be manufactured from any suitable material, including, for example, foam or polyurethane. In the case of a foam pig, the cups 205a and discs 205b may not be present.

A cleaning pig has only been shown herein by example, however the inspection system may include any type of pig in lieu of a cleaning pig.

The sensor device 204 is mounted to the cleaning pig 202 with the mount assembly 210. As shown, for example, the sensor device 204 is mounted to the rear end 208 of the cleaning pig 202.

In other embodiments described herein, mount assembly 210 can be used to mount sensor device 204 to, for example, a rear-end of a foam pig.

The inspection system 200 may be deployed inside a fluid conduit to conduct a first screening. For example, the inspection system 200 may conduct a screening of a pipeline each time the pipeline is cleaned, or each time unwanted fluid is removed from a gas pipeline, to generate regular information about the condition of the pipeline and provide an early warning in case of significant changes in the condition of the pipeline.

In an embodiment described herein, the inspection system 200 may be deployed to determine an isometry of a fluid conduit, e.g. a pipeline. In particular, the inspection system 200 can be used to detect bends in a fluid conduit, the angles, direction and radii of each bend, the relative proximity of consecutive bends, as well as changes to an inner diameter of the fluid conduit.

Data, i.e. in respect of fluid conduit bends and inner diameter changes, may be analyzed to determine whether a traditional high resolution inline inspection tool, such as a caliper or an MFL tool, can be run through the pipeline without getting stuck at a small radius bends, two or more bends which are close together, or small diameter sections of the fluid conduit (e.g., resulting from deformations, or changes to the type of fluid conduit being used, or changes to the inner wall thickness of the fluid conduit).

Referring now to FIGS. 3A to 3E, showing therein a mount assembly 310 for securing a sensor device 304 to a cleaning pig 302, in accordance with an embodiment.

Figure 3A:
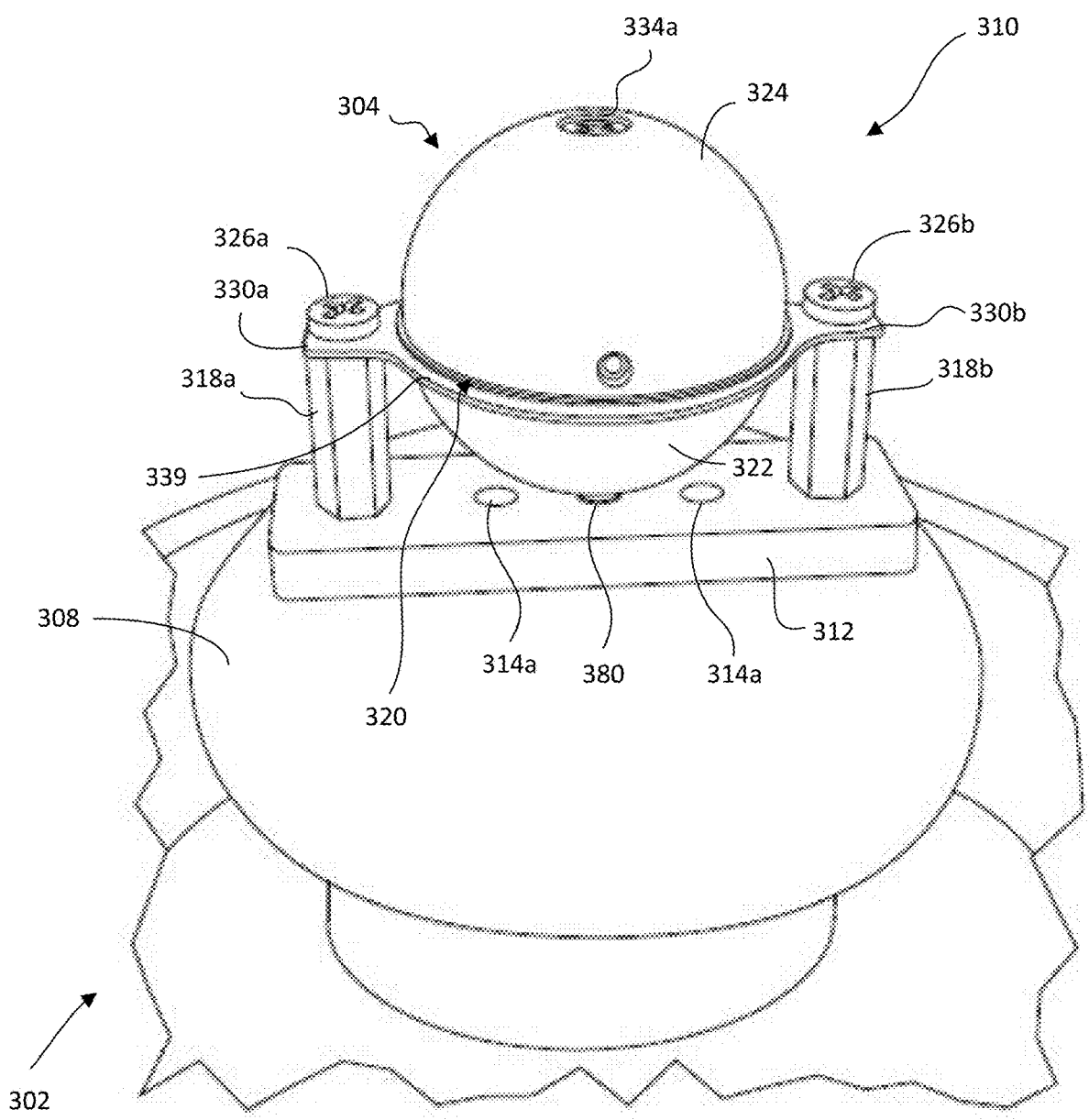
FIG. 3A is an enlarged view of a rear portion of the inspection system of FIG. 2, and showing a mount assembly for removably attaching the sensor device of FIG. 1A to a cleaning pig, in accordance with some embodiments.

Referring first to FIG. 3A, the mount assembly 310 may be analogous to the mount assembly 210 of FIG. 2. The mount assembly 310 may comprise a base plate 312 secured to a cleaning pig 302. For example, the mount assembly 310 may be secured to a rear-end 308 of the cleaning pig 302.

Bolt 380 may be used, for example, to secure the base plate 312 to the cleaning pig 302. Alternatively, any suitable securing mechanism maybe employed to attach the base plate 312 to the cleaning pig 302 (i.e. rivets or resilient adhesives).

In some cases, additional bolts can be inserted into holes 314a, located on opposed sides of bolt 380, in order to minimize rotational movement of the base plate 312 relative to the cleaning pig 302.

While the base plate 312 is illustrated herein as being generally rectangular, the base plate 312 is not limited to any one particular shape.

Extending normally from the base plate 312, and further rearwardly from cleaning pig 302, are a first support member 318a and a second support member 318b. Support members 318a and 318b are shown herein by example as positioned distally along opposite ends of the base plate 312.

An annular plate collar 320 is secured to the support members 318a and 318b by way of fasteners 326a, 326b. As detailed further below, the annular plate collar 320 maybe clamped between a first capsule portion 322 and a second capsule portion 324 of sensor device 304. The annular plate collar 320 may have a concentric outer rim 339.

The annular plate collar 320 may comprise a first extending plate portion 330a, and a second extending plate portion 330b. The extending plate portions 330a and 330b are integral with, and extend laterally from, the annular plate collar 320. A first aperture 328a and a second aperture 328b (shown in FIG. 3B) extend through each of the plate portions 330a and 330b, respectively. The apertures 328a and 328b are configured to receive fasteners 326a and 326b there through.

It will be appreciated by those skilled in the art that the specific quantity, and arrangement, of apertures 328a and 328b along the annular plate collar 320, as well as the shape of the annular plate collar 320 (i.e. as having a concentric outer rim 339, as well as extending plate portions 330a and 330b) is only shown herein by example.

It will also be appreciated that a height of each of column members 318a and 318b may be at least to accommodate the first capsule portion 322 in a space between the base plate 312 and the annular plate collar 320. It may also be appreciated that the column members 318a and 318b are at least distally spaced from each other to accommodate the first capsule portion 322 in a space between the two column members 318a and 318b.

While the mount assembly 310 is shown as being used in conjunction with a cleaning pig, the mount assembly may also be used with other tools which are conventionally deployed in fluid conduits (e.g. a caliper tool).

With reference to FIGS. 3B to 3E, a method for attaching the sensor device 304 to the mount assembly 310 will now herein be described.

Figure 3B:
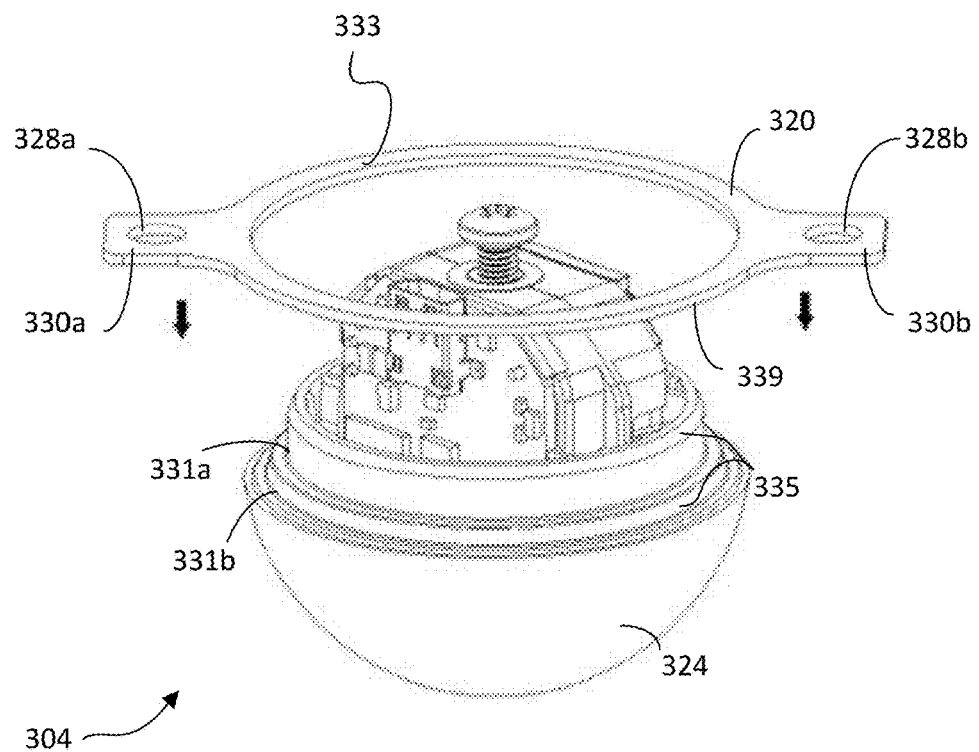
FIGS. 3B and 3C are perspective views of a sensor device with an outer portion removed to expose an interior compartment, and showing an attachment of an annular plate collar to the sensor device, in accordance with an embodiment.
Figure 3C:
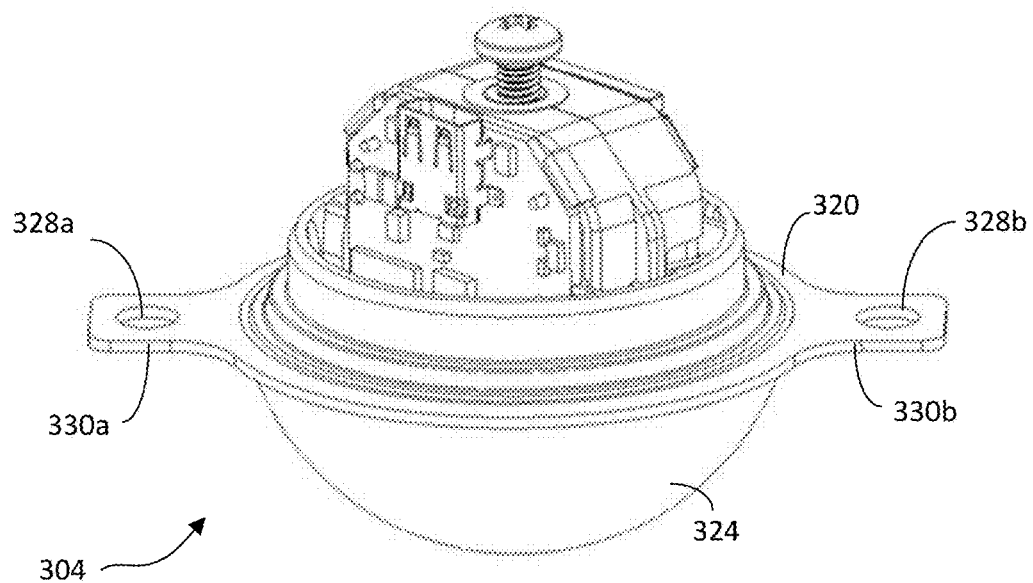

FIGS. 3B and 3C are perspective views of the sensor device 304 with an outer portion removed to expose an interior compartment.

As best shown by these figures, the second capsule portion 324 may include one or more concentric edges 331a, 331b of varying radii, which are separated by concentric lateral faces 335.

The annular plate collar 320 is lowered from an initial first position, whereby the collar 320 is positioned over the second capsule portion 324 (FIG. 3B), to a second final position, whereby the annular plate collar 320 is engaged with the second capsule portion 324 (FIG. 3C). In the second final position, the annular plate collar 320 is engaged from a bottom surface (not shown) with the concentric edge 331b, and is further engaged from an inner-side surface 333 with the concentric lateral face 335.

It will be understood that the annular plate collar 320 is at least sized so as to be received over the concentric lateral face 335 and to form a tight engagement therewith.

Figure 3D:
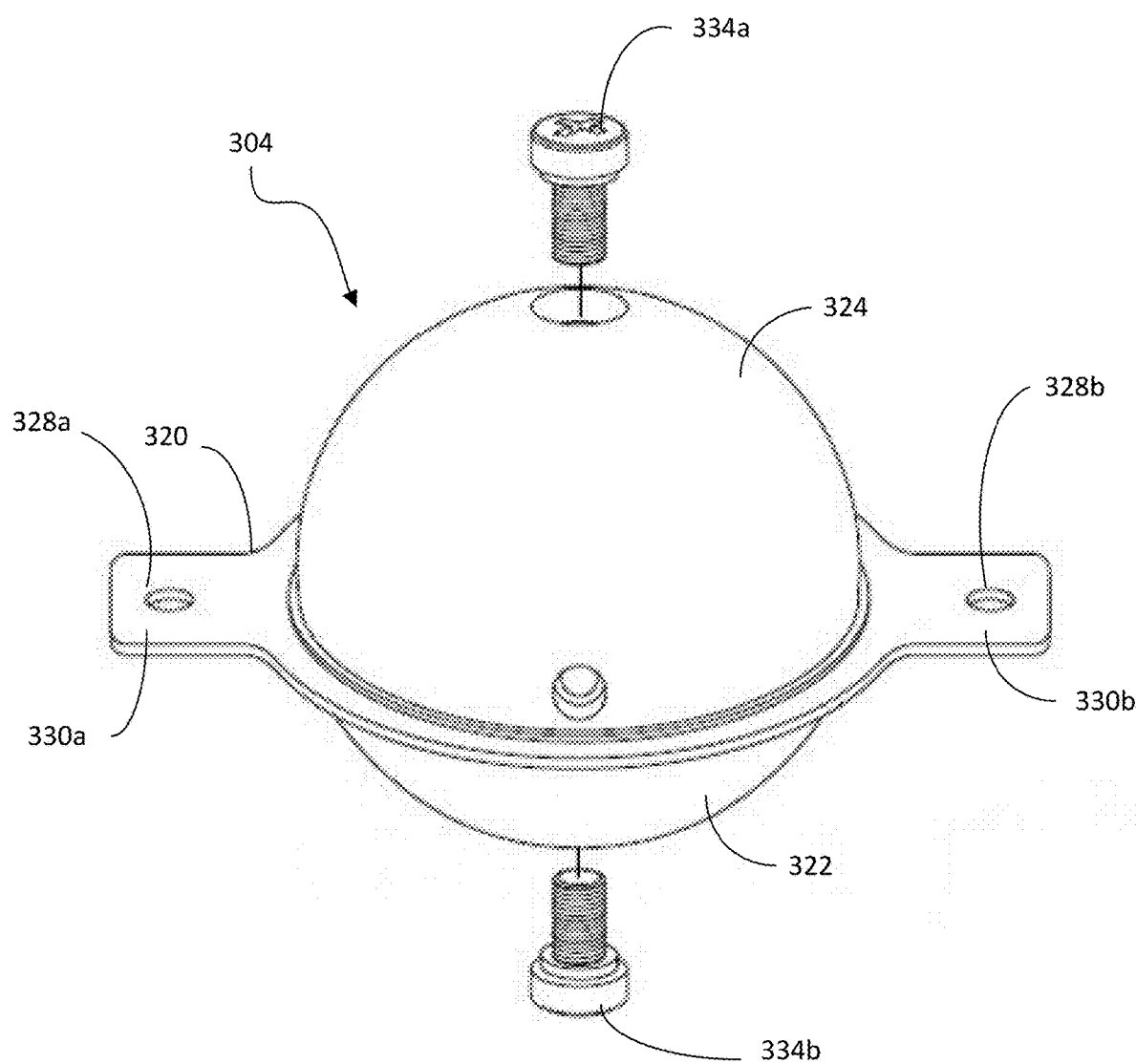
FIG. 3D is a partially exploded view of a sensor device, and showing the outer capsule portions being closed together to secure the annular plate collar.

In reference now to FIG. 3D, showing a partially exploded view of a sensor device, and showing the outer capsule portions closed together so as to secure the annular plate collar.

In particular, fasteners 334a, 334b are threadedly engaged into the top and bottom portions of the first capsule portion 322 and second capsule portion 324, respectively, so to close the outer capsule. In this manner, the annular collar plate 320 maybe clamped, or secured, between the first capsule portion 322 and the second capsule portion 324.

In other embodiments, the sensor device may be closed using only one fastener.

Figure 3E:
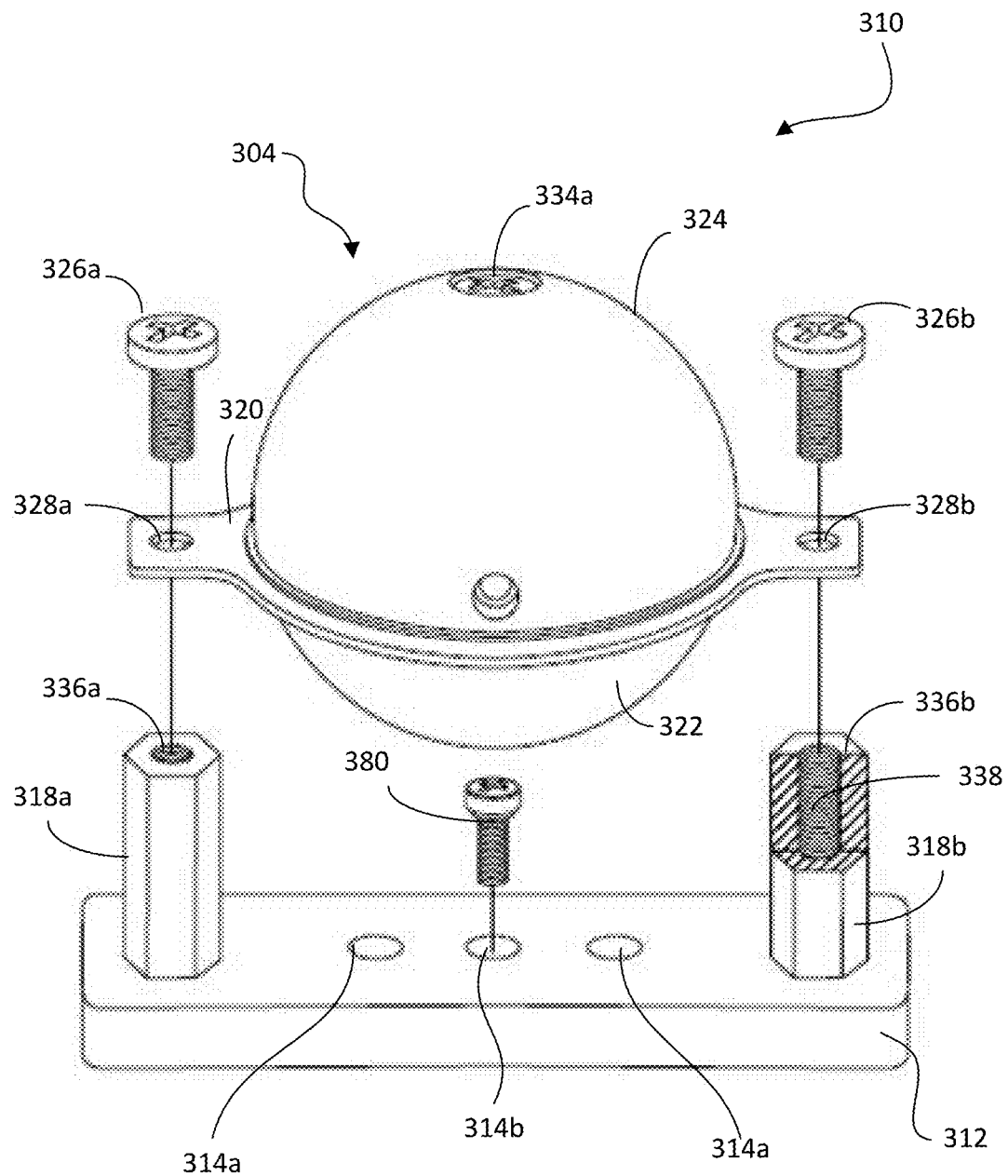
FIG. 3E is a partially exploded view of the mount assembly shown in FIG. 3A, and showing the sensor device being attached thereto.

In reference now FIG. 3E, showing therein a partially exploded view of the mount assembly 310 to secure the sensor device to the cleaning pig.

The mounting assembly 310 may be secured to a cleaning pig by driving bolt 380 through central hole 314b, of the base plate 312, and into a rear-end of the cleaning pig (not shown).

Each of column members 318a and 318b may include, at a top face, an opening 336a and 336b leading to a connector 338. The connector 338 connects the column members 318a and 318b to the plate collar 320. The connector 338 may be configured to connect the column members 318a and 318b to the plate collar 320 by engaging a fastener, such as fasteners 326a and 326b. The connector 338 may be a threaded bore. The threaded bore 338 extends at least partially into column members 318a and 318b along a longitudinal axis. The annular plate collar 320 is positioned over column members 318a and 318b such as to align the apertures 328a and 328b over openings 336a and 336b, respectively. Fasteners 326a and 326b are placed through apertures 328a and 328b, respectively, and are threadedly engaged with threaded bores 338. By this manner, the annular plate collar 320 (and sensor device 304) are secured to the column members 318a and 318b as shown in FIG. 3A.

If it is desired to disengage the sensor device 304 from the cleaning pig, the above steps are repeated in reverse order. In particular, the fasteners 326a and 326b are unthreaded from threaded bores 338 of column members 318a and 318b. The sensor device 304, and annular plate collar 320, are removed. Fastener 334b is unthreaded from the outer capsule portions 322 of sensor device 304. The first capsule portion 322 is then removed to expose the inner compartment of the sensor device 304, and the annular plate collar 320 may be dislodged from the second capsule portion 324.

While the embodiment disclosed herein shows the mount assembly 310 as comprising two column members, and an annular plate collar having two apertures, it will be appreciated that this has only been shown by way of example. For example, the mount assembly 310 may comprise one or more column members, which are arranged in any manner along the base plate, and which are used in conjunction with an annular plate collar having one or more apertures. It will be further appreciated that at least some of the apertures, of the annular collar plate, be positionally aligned with the top openings of the one or more column members.

Figure 7A:
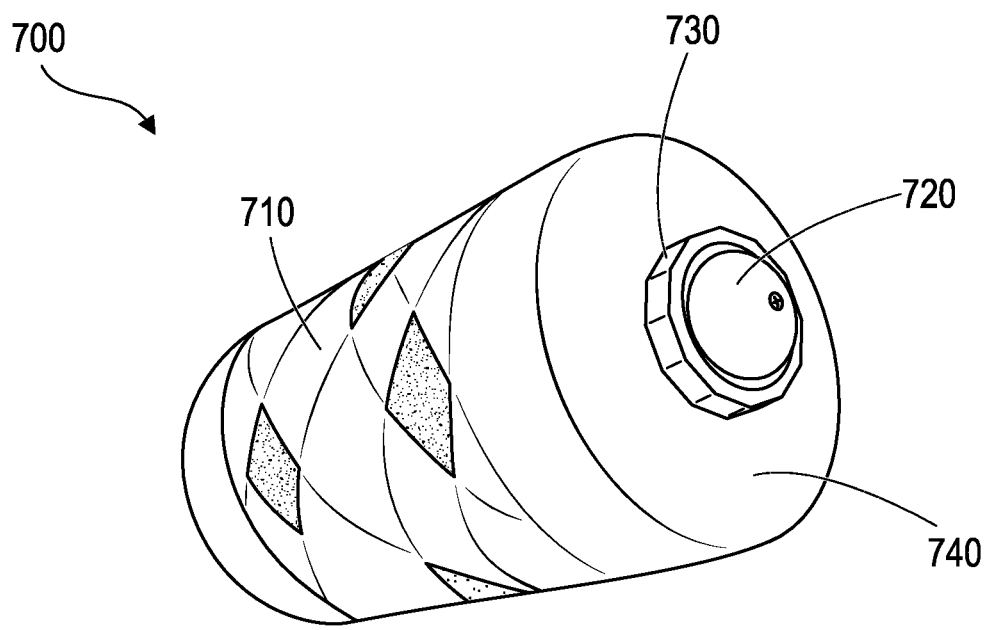
FIGS. 7A to 7C are images of an alternative mounting assembly for removable mounting of a sensor device to a cleaning pig.

Referring now to FIG. 7A, illustrating therein an example inspection system 700 which uses an alternative mounting assembly 730 to secure a sensor device 720 to a foam pig 710. The mounting assembly 730 is embedded into a rear-end 740 of the foam pig 710.

Figure 7B:
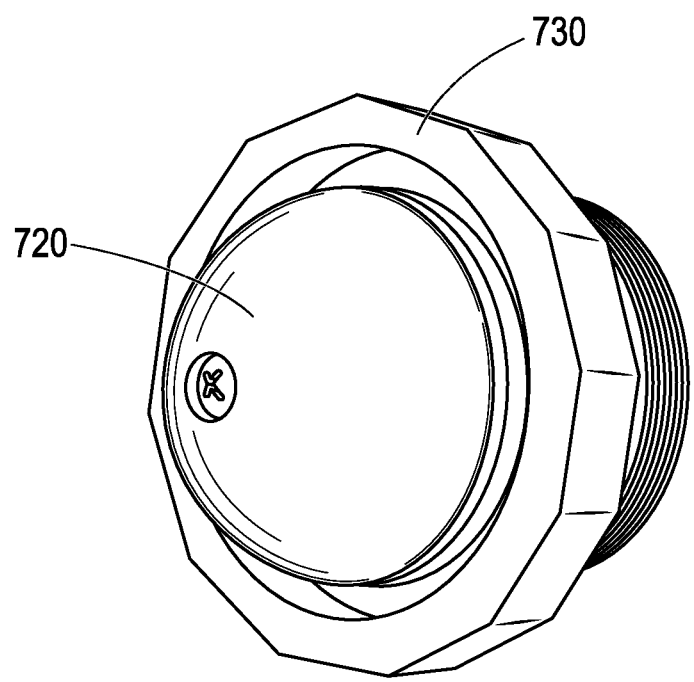
Figure 7C:
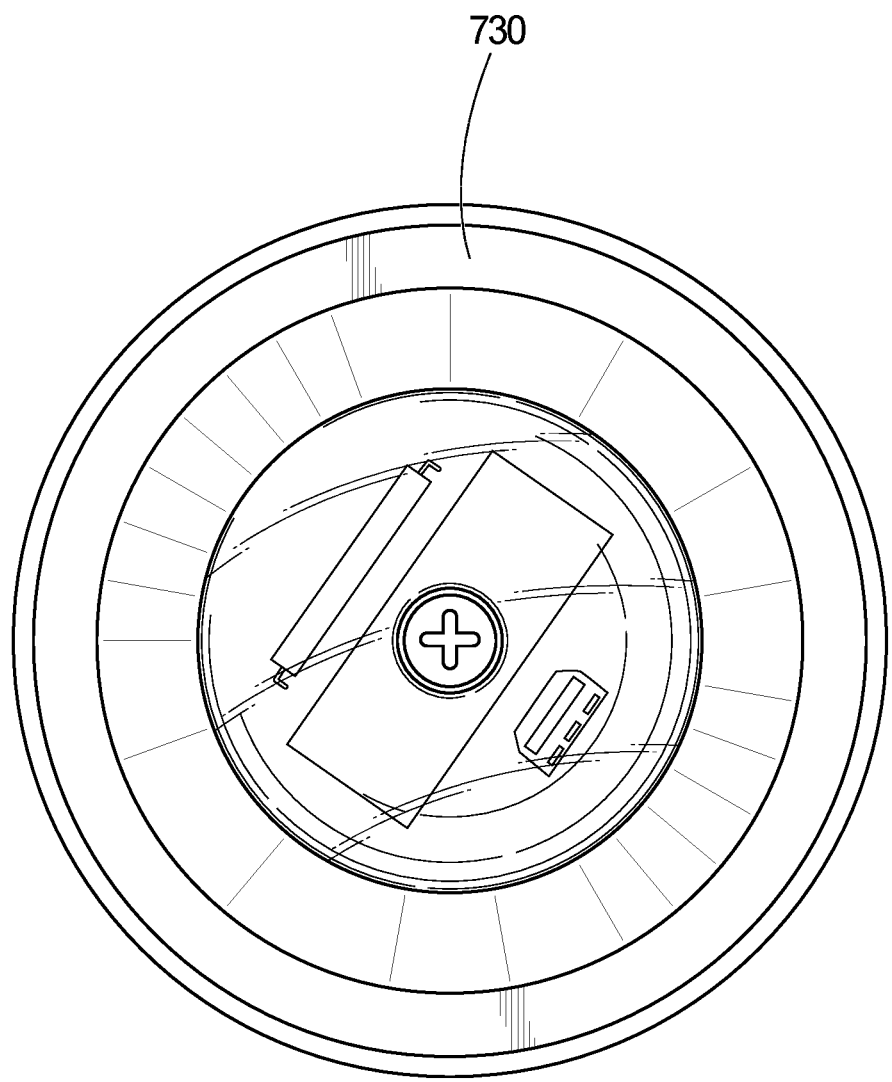

FIG. 7B shows an enlarged view of the alternative mounting assembly 730 and sensor device 720. The alternative mounting assembly 730 has a chamber which receives a portion of the sensor device 720. FIG. 7C shows a top plan view of the alternative mounting structure 730.

In some embodiments, a mount assembly, such as mount assembly 210 of FIG. 2, can be used to mount sensor device 720 to the rear-end 740 of the foam pig 710.

Figure 4A:
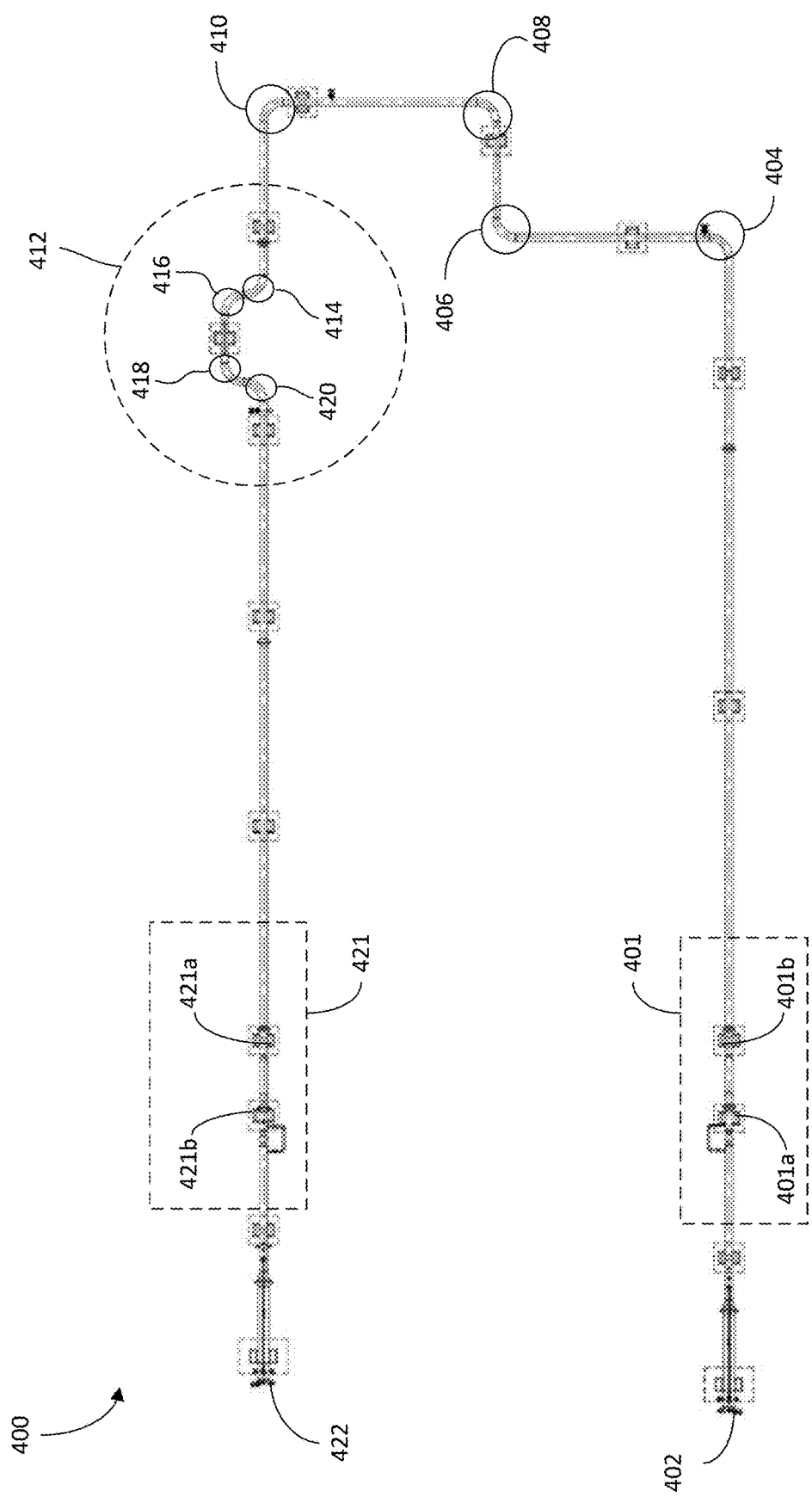
FIG. 4A is a schematic representation of an example pipeline loop used in an experiment for collecting data using a combined caliper tool and sensor device.

In reference now to FIG. 4A, illustrating therein a schematic of a pipeline loop 400, and various components and sections, which may be used for collecting data using the inspection system 200 of FIG. 2. In particular, the inspection system 200 maybe used at least to collect data in respect to the number of bends in the pipeline 400 and the angle of each bend in pipeline 400, using a tri-axial gyroscope disposed inside of the sensor device of the inspection system. In some cases, the inspection system 200 can also collect data in respect of the radius of each bend in pipeline 400, as well as the distance between consecutive bends, by using data from both a gyroscope and an accelerometer disposed inside of the sensor device. In still other cases, the inspection system 200 can measure changes to an inner diameter of the pipeline 400 using a pressure sensor disposed on the sensor device.

The pipeline 400 includes a launching pigging valve 402, a declining bend section 401, a first bend 404, a second bend 406, a third bend 408, a fourth bend 410, a fifth bend section 412, an ascending bend section 421, and a receiving pigging valve 422.

The fifth bend section 412 comprises four closely spaced bends 414, 416, 418, 420, which can be used to assess whether the inspection system is able to detect a number of close proximity bends (i.e., to determine whether a traditional inline inspection tool can be run through the pipeline without getting stuck in closely proximate bends).

Each of the bends in pipeline 400, with the exception of bends located in bend sections 401 and 421, is at an approximate ninety-degree angle along a horizontal plane which is parallel to ground level. In particular, using the launching pigging valve 402 as a starting reference, some of the bends 404-420 in pipeline 400 maybe characterized as turning in a generally clockwise direction (i.e. 406, 414, and 420), while other bends maybe characterized as turning in a generally counter-clock wise direction (i.e. 404, 408, 410, 416, and 418). As explained in further detail below, the bend direction is also reflected in gyroscopic data collected by the sensor device.

In respect of bend sections 401 and 402, each of the bend sections 401 and 421 includes two consecutive bends, each at a substantially 30 degree angle in a vertical plane.

Figure 4B:
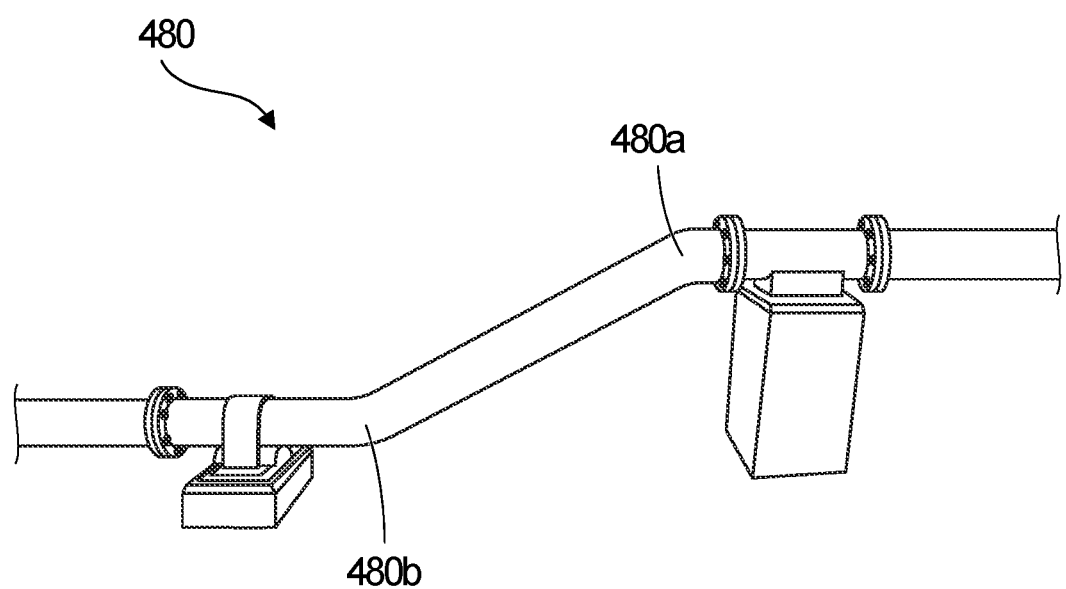
FIG. 4B is an image of an example bend section of a pipeline loop.

More particularly, FIG. 4B shows an example bend section 480 analogous to either declining bend section 401 or ascending bend section 421. The bend section 480 includes two sequential bends, 480*a* and 480*b*, each at a thirty degree angle in the vertical plane. Bend 480*a* and 480*b* may be analogous to either bends 401*a* and 401*b* of descending bend section 401, or bends 421*b* and 421*a* of ascending bend section 421, respectively.

In the case of descending bend section 401, bends 401*a* and 401*b* serve to lower the height of the pipeline relative to ground level. In the case of ascending bend section 421, bends 421*a* and 421*b* serve to increase the height of the pipeline relative to the ground level. Bend sections 401 and 421 help to ensure that the launching and receiving pigging valves 402 and 422, respectively, are accessible to an operator at a higher than ground level.

The pipeline loop 400 extends roughly 260 feet, and the pipes used in the pipeline loop 400 are approximately 8 inches in diameter.

The inspection system 200 may follow the pipeline loop 400 from the launching pigging valve 402 to the declining bend section 401, first bend 404, the second bend 406, the third bend 408, the fourth bend 410, the fifth bend section 412, the ascending bend section 421, and towards the receiving pigging valve 422.

When the inspection system 200 reaches the receiving pigging valve 422, it can either be extracted from the pipeline loop 400 so that the collected data can be analyzed, or can be redeployed into the pipeline loop 400 again to conduct more runs of the experiment, thereby collecting more data. The inspection system 200 can be inserted into the launching pigging valve 402, and retrieved from receiving pigging valve 422.

Figure 4C:
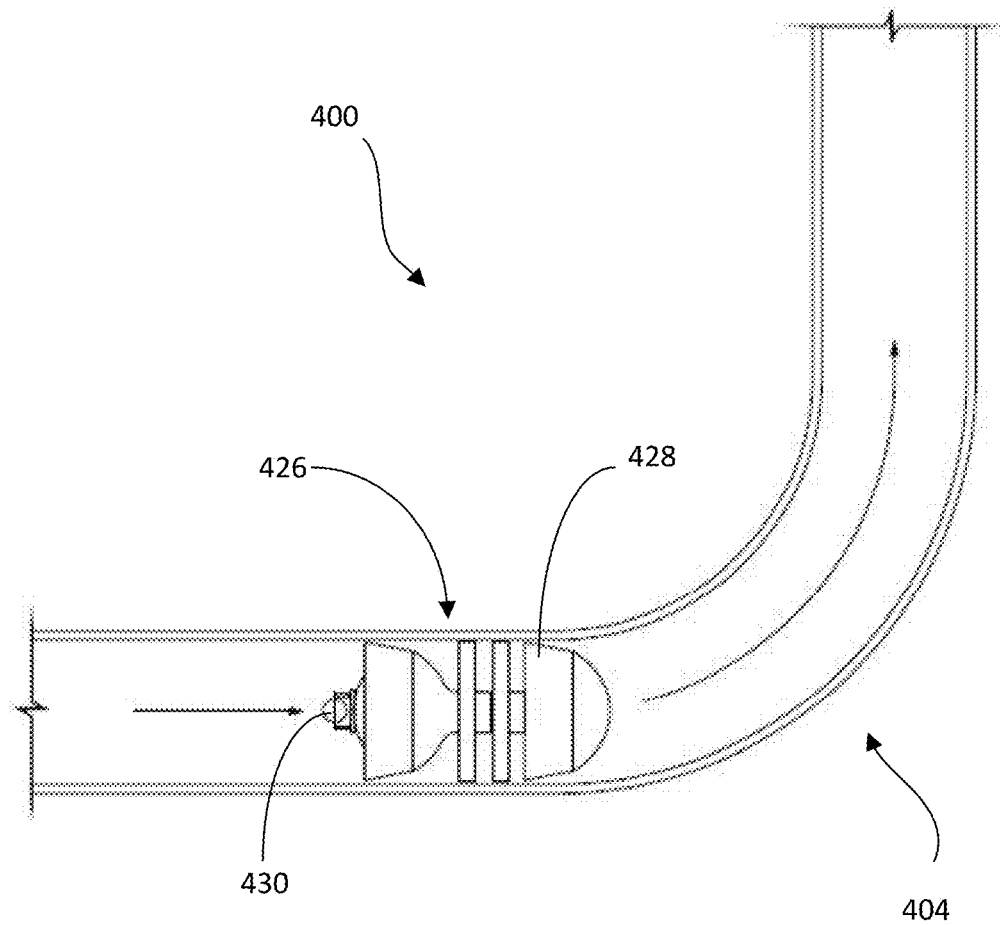
FIG. 4C is a cut-away top view of a portion of the pipeline loop of FIG. 4A, and showing an inspection system inserted therein.

FIG. 4C is a cut-away top view of a portion of the pipeline loop 400 at the first bend 404. In particular, FIG. 4C shows an inspection system 426 being carried through pipeline 400. The inspection system 426 includes a sensor device 430 secured to a rear end of a cleaning pig 428 using, for example, mounting assembly 310 of FIG. 3A. The inspection system 426 may be analogous to inspection system 200 of FIG. 2.

As shown, the pig 428 is generally sized to a diameter of pipeline 400. This ensures that lateral movement of the pig 428 (i.e. side-to-side movement) and bypass of the fluid is minimized. Movement of the inspection system 426 is accordingly generally limited to a linear movement resulting from a forward pressure applied to a rear end of the pig 428 by the pipeline fluid.

Further, as the sensor device 430 is stabilized with respect to the cleaning pig 428, rotations recorded by the sensor device 430 (i.e. from a tri-axial gyroscope) are also generally limited to only those rotations resulting from the cleaning pig 428 turning with a bend in the pipeline.

In some cases the gyroscope can record extraneous rotations which do not result from a bend in the fluid conduit. For example, the gyroscope can record rotations of the pig 428 turning about its own axis. These rotations, however, typically occur in an axis of rotation which is different than the axis of rotation of bends inside of the fluid conduit, and are accordingly distinguishable on this basis. In cases where incidental rotations occur in the same axis as the rotation of bends inside of the fluid conduit, these rotations are typically of a small magnitude and can be compensated for on this basis.

By way of a simple example, when the inspection system 426 travels through a first bend 404, a tri-axial gyroscope can measure the rotation of the inspection system 426 resulting from the turn of bend 404 along a known axis of rotation.

This is contrasted to a free-floating sensor device, wherein the sensor device may measure a variety of rotational data. For example, the free-floating sensor device may measure the rotation of the sensor about its own axis, i.e. as it is carried by the fluid, which is more difficult to distinguish from the rotation of the sensor about a bend in the fluid conduit. Alternatively, the free-floating sensor device may measure rotational data as a result of being bounced around inside of the pipeline cavity.

Therefore, by stabilizing the sensor device with respect to the cleaning pig, the inspection system 426 has the advantage of effectively mapping bends inside a pipeline such that extraneous or incidental rotations of the inspection system (i.e., not resulting from fluid conduit bending) can easily be filtered from gyroscopic data.

The sensor device 204, 430 may also include other sensors, in addition to a tri-axial gyroscope. For example, the sensor device may include sensors for measuring pressure, acceleration, temperature, magnetic field, and acoustics.

Incorporating different sensors into sensor device 204, 430, may help in mapping other properties of a fluid conduit, beyond bends inside of the fluid conduit. For example, inner diameter changes in a pipeline, i.e. due to a deformation, or a rougher inner wall section of a pipeline, maybe sensed by reading pressure data. In particular, if an inspection system is wedged in a small diameter region of the pipeline (i.e., due to a deformed region of the pipeline, or changes in the pipeline type, or a region of the pipeline having a thicker inner wall thickness), or a rough inner wall section of a pipeline, the sensor device may read a build-up of fluid pressure at a rear-end of the pig. Alternatively, if the inspection system traverses a region with an increased pipeline diameter, the sensor may read a reduced pressure at the rear-end of the pig.

A combination of sensors, (i.e. pressure, acoustic, IMU, etc.), may also be used to provide a first indication of critical anomalies in the pipeline 400 (e.g. significant deposits, dents, weld patterns, wall thickness changes, and leaks).

Figure 5A:
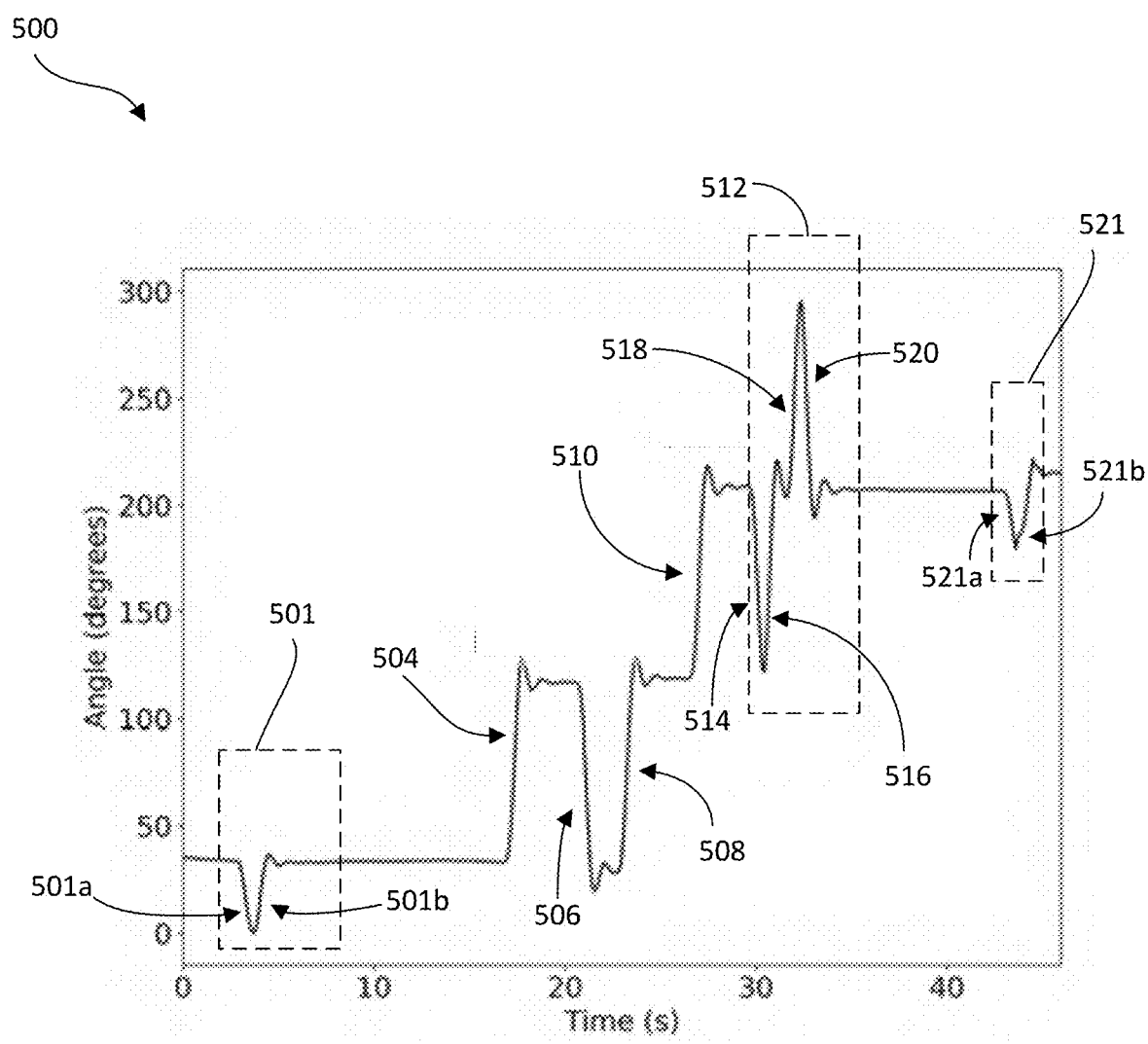
FIG. 5A is a graph of integrated gyroscopic data collected by a sensor device inside of the pipeline loop of FIG. 4A.
Figure 5B:
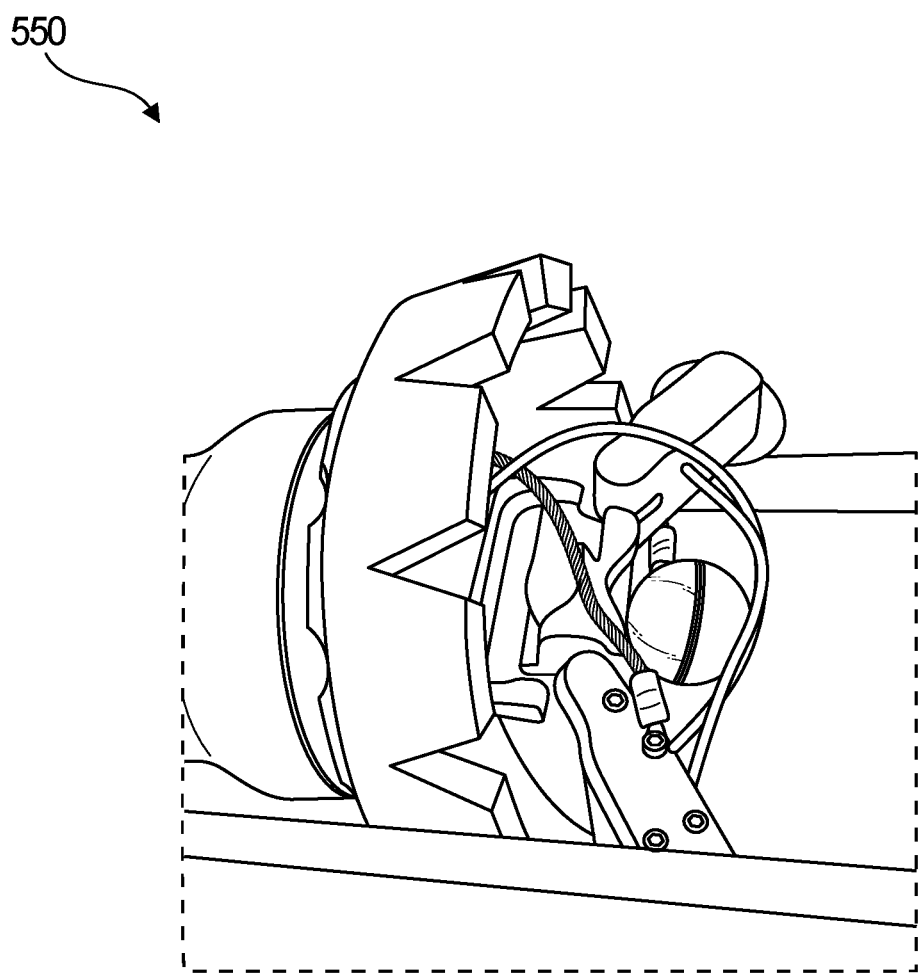
FIG. 5B is an image of a rear-end of a combined caliper tool and sensor device.

Reference is now made to FIG. 5A, showing a graph 500 of integrated gyroscopic data collected by a combined caliper tool and sensor device passing through the pipeline 400. In this case, the caliper tool is used in lieu of a cleaning pig. FIG. 5B shows as example an image of a rear-end of a combined caliper tool and sensor device 550.

In particular, the combined caliper tool and sensor device passes through the descending bend section 401, first bend 404, second bend 406, third bend 408, fourth bend 410, fifth bend section 412, and ascending bend section 421 of the pipeline loop 400. The graph 500 shows integrated gyroscopic data in degrees, and as a function of time. Moreover, the data in graph 500 plots a combination of rotations in the vertical and horizontal axes.

As demonstrated by graph 500 when the combined caliper tool and sensor device pass through each bend, corresponding sharp increases or decreases in the integrated gyroscopic data (hereinafter generally referred to as "rises" or "drops" in the data, respectively) are observed due to a rotation of the sensor device. Regions 501, 504, 506, 508, 510, 512, and 521 correspond to the descending bend section 401, first bend 404, second bend 406, third bend 408, fourth bend 410, fifth bend section 412, and ascending bend section 421, respectively. Further, regions 514, 516, 518, and 520 correspond to bends 414, 416, 418, 420 within the fifth bend section 412, respectively. Regions 501*a* and 501*b* correspond to bends 401*a* and 401*b* within descending bend section 401, respectively. As well, regions 521a and 521b correspond to bends 421a and 421b within ascending bend section 421, respectively.

The graph 500 shows an initial reading of approximately 40 degrees. At each 90 degree counter-clockwise turn in a horizontal plane, the tri-axial gyroscope measures a +90 degree rotation. Conversely, at each 90 degree clockwise turn in the horizontal plane, the gyroscope measures a −90 degree rotation. Accordingly, gyroscopic data maybe informative, not only about the presence of a bend, but also about the turning direction of the bend (i.e. as clockwise or counter clockwise). Further, the rotational measurements are recorded cumulatively through the duration of the run.

Starting at descending bend section 401, the gyroscope reads two consecutive thirty degree rotations. In particular, the gyroscope records a 30 degree drop at 501a, which corresponds to the bend 401a, and records a 30 degree rise at 501b which corresponds to the second ascending bend 401b. The drop and rise at 501a and 501b result from the gyroscope rotating in opposite directions at bends 401a and 401b, respectively.

At first bend 404, the gyroscope reads a +90 degree counter-clockwise turn, which results in a rise of graph 500 to 130 degrees at region 504 (i.e. the addition of 90 degrees to the initial 40 degrees reading). At the second bend 406, the gyroscope reads a −90 degree clockwise turn, resulting in a return of graph 500 to a reading of 40 degrees at region 506 (i.e. the initial reading). After the third bend 408, the gyroscope records a +90 degree counter-clockwise turn, which is shown by a rise back to 130 degrees at region 508. After the fourth bend 410, the gyroscope again reads a +90 degree counter clockwise turn, and accordingly, the graph rises to 220 degrees (i.e. the addition of 90 degrees over 130 degrees) at region 510.

At the fifth bend section 412, a series of consecutive rises and drops can be observed in graph 500 in region 512, which are attributed to the close proximity of bends 414, 416, 420, and 422. At bend 414, the gyroscope records a −90 degree clockwise rotation, which is represented by the graph 500 as a drop to 130 degrees, at region 514. At bend 416, the gyroscopes records a +90 degree counter clockwise rotation, which results in the rise at region 516 back to 220 degrees. At bend 418, the gyroscope records another +90 degree counter clockwise rotation, and the graph 500 rises to a 310 degree reading at region 518. Finally, at bend 420, the gyroscope records a −90 degree clockwise rotation, resulting in a drop of the graph 500 back down to 220 degrees.

At the ascending bend section 421, the gyroscope again reads two consecutive 30 degree rotations. The gyroscope records a 30 degree drop at 521a corresponding to first bend 421a, and records a 30 degree rise at 521b corresponding to the second bend 421b.

Accordingly, the collected data, as represented by graph 500, is informative in at least four respects: (1) it identifies the number of bends inside of a fluid conduit (i.e. the number of steep slopes in the graph); (2) it identifies the angle of each bend; (3) it shows the relative distance between consecutive bends (i.e. the quick rises and drops at region 512); and (4) it shows the relative direction of rotation of each bend in the pipeline.

It will be appreciated that by combining the gyroscopic data 500 with other sensory data (i.e. acceleration data), more precise information about the properties of the pipeline can be gauged. For example, the acceleration data can be integrated with gyroscopic data to resolve the absolute direction of rotation as well as the radius of each bend. Further, precise localization of the bends maybe done by combining run time, with known elements of the pipeline (e.g. weld patterns, flanges, risers, etc.).

Figure 6:
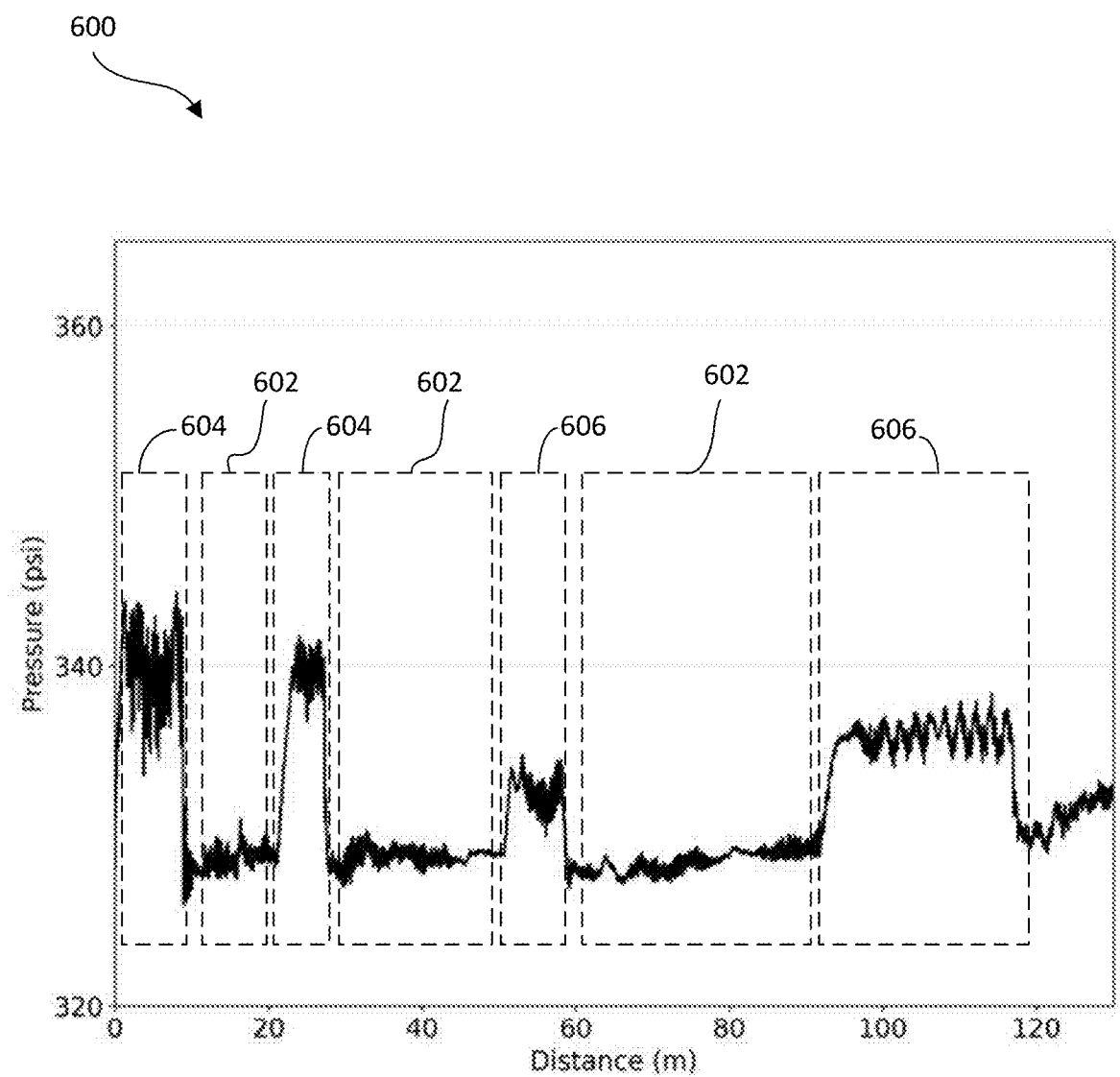
FIG. 6 is a graph of pressure measurements collected by an inspection system inside of a pipeline.

Reference is now made to FIG. 6, showing an example graph 600 of pressure data collected by an inspection system, such as inspection system 200 of FIG. 2 or 426 of FIG. 4C, as it passes through a pipeline.

The pressure data can be measured by a pressure sensor located on a sensor device. For example, this may be pressure sensor 142 of sensor device 100 in FIG. 1A. As the sensor device is located at the rear-end of the cleaning pig, the pressure sensor can measure pressure, applied by a fluid, to the rear-end of the pig as the fluid pushes the pig forward through the pipeline.

In various cases, the pressure data can be used to detect changes to the inner diameter of the pipeline (i.e., resulting from dents or deformations to the pipeline, or changes to the pipeline type, or changes to the inner wall thickness of the pipeline). For example, if the cleaning pig travels through a section of the pipeline with a narrow diameter, the pig may slow down due to contact forced between the pig, and the inner wall of the pipeline. As the pig slows down, a resulting build-up of fluid pressure accrues at the rear-end of the pig. The build-up of fluid pressure is captured by the pressure sensor, and may be used to identify the regions of the pipeline with decreased inner diameter. Likewise, if the pig traverses through a section of a pipeline with a wider diameter, the pressure sensor will record a reduced fluid pressure at the rear-end of the pig.

In other cases, pressure data can also help identify rougher inner wall sections, or bends in a fluid conduit, that may also cause the pig to slow down its movement through the fluid conduit.

Returning to FIG. 6, the pressure data in graph 600 is shown in units of pounds per square inch (PSI) and as a function of the distance travelled by the inspection system through a pipeline. More particularly, graph 600 shows three different pressure regions 602, 604, and 606 which correspond to three different regions of an example pipeline. Each of the three different regions of the example pipeline is defined by specific pipeline dimension, as shown in Table 1:

TABLE 1

Dimensions of different regions of an example pipeline

| Region | Outer diameter OD (mm) | Wall thickness WT (mm) | Inner diameter (=OD − 2 * WT) (mm) |
| --- | --- | --- | --- |
| 602 | 168.3 | 3.18 | 161.94 |
| 604 | 168.3 | 7.11 | 154.08 |
| 606 | 168.3 | 4.78 | 158.74 |

As shown, region 602 is defined by the widest inner diameter (161.94 mm), followed by region 606 (158.74 mm), and region 604 (154.08 mm). Accordingly, in FIG. 6, the largest pressure values are recorded at regions 604 (i.e., the smallest diameter region), followed by regions 606 and 602.

Figure 8:
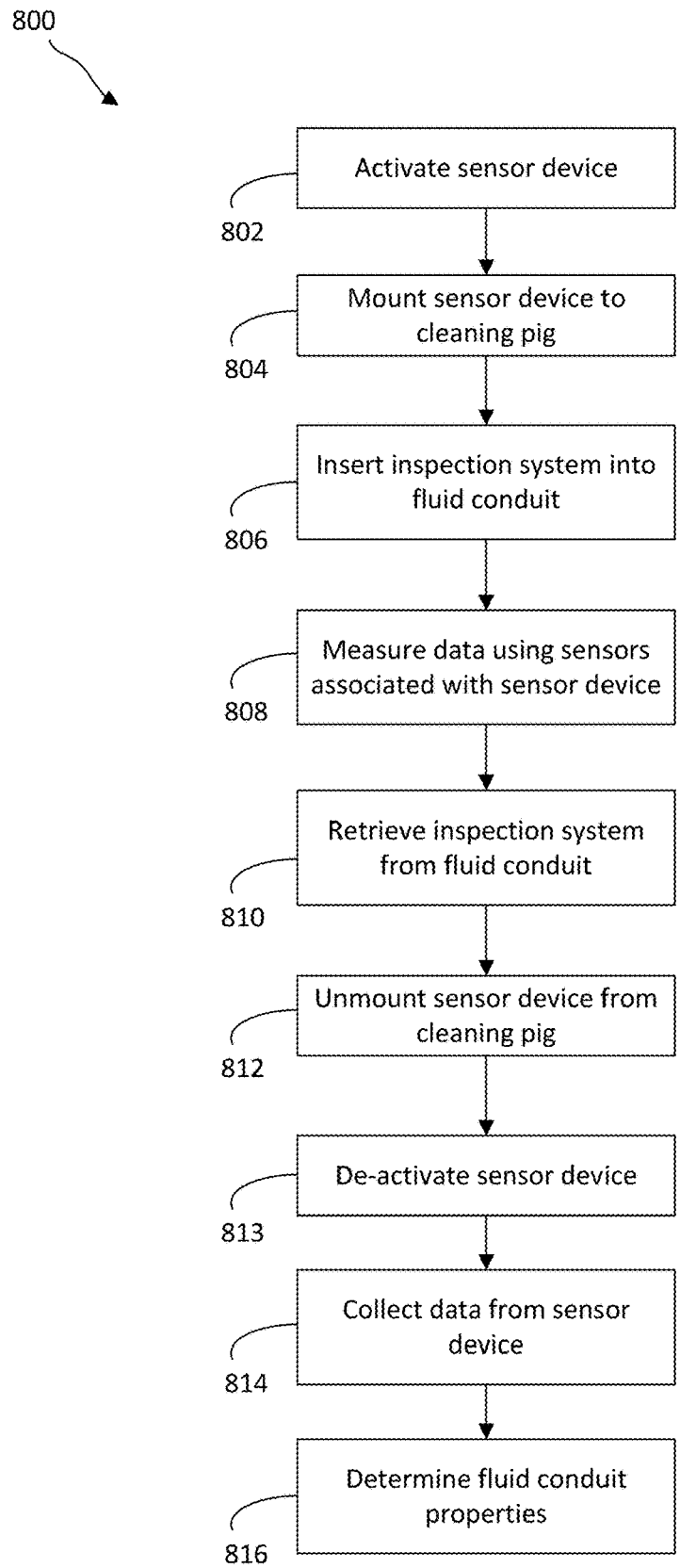
FIG. 8 is a flow chart of an example method for collecting fluid conduit data using an inspection system, in accordance with an embodiment.

In reference now to FIG. 8, showing therein a flow chart of an example method 800 for determining fluid conduit properties, such as bending in the fluid conduit or changes to an inner diameter thereof.

At 802, the sensor device may be activated. At 804, the sensor device is mounted to a cleaning pig, using one of the mount assemblies described herein, so as to form the inspection system. In some cases, 804 may be performed before 802, such that the sensor device is first mounted to the cleaning pig before the sensor device is activated. At 806, the inspection system is inserted into a fluid conduit. At 808, the inspection system travels through the fluid conduit and measures data using sensors associated with the sensor device. For example, data can be measured using a tri-axial gyroscope, a tri-axial accelerometer, and/or a pressure sensor disposed on, or within, the sensor device. At 810, the inspection system is retrieved from the fluid conduit.

At 812, the sensor device is detached (or unmounted) from the cleaning pig. At 813, the sensor device may be deactivated. In some cases, 813 may be performed before 812, such that the sensor device is first de-activated, before the sensor device is detached from the cleaning pig. At 814, data from the sensor device is collected. For example, data from a tri-axial gyroscope, a tri-axial accelerometer, or a pressure sensor disposed on, or within, the sensor device, is read from a memory chip in the sensor device. At 816, the collected data at 814 may be used to determine properties of the fluid conduit. For example, the angular data from a tri-axial gyroscope can provide information on the number of bends, the angles of each bend, as well as the relative distance between the bends. Data from a tri-axial accelerometer, used in conjunction with gyroscope data, can indicate the direction and radius of various bends, as well as the distance between consecutive bends. Further, data from a pressure sensor can indicate changes in the inner diameter of a pipeline, as well as the presence of rougher internal wall sections of a pipeline. As previously mentioned, other sensors maybe included in the sensor device to complement the data retrieved from the tri-axial gyroscope, accelerometer, and/or pressure sensor.

While the above description provides examples of one or more apparatus, methods, or systems, it will be appreciated that other apparatus, methods, or systems may be within the scope of the claims as interpreted by one of skill in the art.

The invention claimed is:

1. An inspection system for collecting data in a fluid conduit, the inspection system comprising:
   a cleaning pig, wherein the cleaning pig is defined by at least a front end and a rear end, the rear end being distally opposed to the front end along a longitudinal axis; and
   a mount assembly secured to the cleaning pig; and
   at least one sensor device removably coupled to the mount assembly, the at least one sensor device comprising a spherical outer capsule which provides fluid tight containment and pressure resistivity to an interior compartment, the spherical outer capsule comprising a first capsule portion and a second capsule portion that together enclose the interior compartment, the first and second capsule portions being separable to provide access to the interior compartment, the interior compartment containing a tri-axial gyroscope for measuring angular rotation of the at least one sensor device and an external-facing pressure sensor for measuring pressure data, the external-facing pressure sensor installed in an aperture in the outer capsule, the at least one sensor device configured for use as a free-floating sensor device independent of the cleaning pig when uncoupled from the mount assembly.

2. The inspection system of claim 1, wherein the tri-axial gyroscope measures rotational data for determining an isometry of the fluid conduit.

3. The inspection system of claim 1, wherein the interior compartment of the at least one sensor device further contains an accelerometer, and wherein the inspection system is configured to use acceleration data from the accelerometer with rotational data from the tri-axial gyroscope to determine direction and radii of one or more bends in the fluid conduit.

4. The inspection system of claim 1, wherein the inspection system is configured to detect bending in the fluid conduit.

5. The inspection system of claim 1, wherein the inspection system is configured to measure angles, of one or more bends, in the fluid conduit.

6. The inspection system of claim 1, wherein the inspection system is configured to measure radii, of one or more bends, in the fluid conduit.

7. A mount assembly for removably attaching a sensor device to a pig, the mount assembly comprising:
   a base plate for securing to the pig;
   at least two column members extending from the base plate along a first axis, wherein the at least two column members are spaced from each other at a first distance along a second axis;
   a plate collar for securing to the sensor device;
   wherein the plate collar is attachable to the at least two column members; and
   wherein each column member includes a connector for connecting the column member to the plate collar.

8. The mount assembly of claim 7, wherein the plate collar includes at least two apertures extending therethrough, the apertures spaced on the plate collar at the first distance;
   at least two fasteners operable to secure the plate collar to the at least two column members, wherein each fastener is receivable through a respective one of the at least two apertures in the plate collar; and
   wherein each fastener is configured to engage a respective one of the at least two column members via the connector, thereby securing the plate collar to the at least two column members.

9. The mount assembly of claim 7, wherein the sensor device comprises an outer capsule;
   the outer capsule comprising a first capsule portion and a second capsule portion that together enclose an interior compartment of the sensor device, and can be separated to provide access to the interior compartment; and
   wherein the plate collar is secured between the first capsule portion and the second capsule portion when the first and second capsule portions enclose the interior compartment.

10. A method for collecting data in a fluid conduit, the method comprising:
    inserting an inspection system inside of the fluid conduit, wherein the inspection system comprises:
    a cleaning pig; and
    at least one sensor device removably attached to the cleaning pig, the at least one sensor device comprising a spherical outer capsule which provides fluid tight containment and pressure resistivity to an interior compartment, the spherical outer capsule comprising a first capsule portion and a second capsule portion that together enclose the interior compartment, the first and second capsule portions being separable to provide access to the interior compartment, the interior compartment containing a tri-axial gyroscope and an external-facing pressure sensor for measuring pressure data, the external-facing pressure sensor installed in an aperture in the outer capsule, the at least one sensor device configured for use as a free-floating sensor device independent of the cleaning pig when not attached to the cleaning pig;

measuring rotational data using the tri-axial gyroscope; and retrieving the inspection system from the fluid conduit.

11. The method of claim 10, further comprising:

determining an isometry of the fluid conduit using the rotational data measured by the triaxial gyroscope.

12. The method of claim 10 further comprising:

determining the presence of one or more bends in the fluid conduit using the rotational data.

13. The method of claim 10 further comprising:

determining the presence of a bend section having one or more closely spaced bends in the fluid conduit using the rotational data.

14. The method of claim 10 further comprising:

determining an angle of one or more bends in the fluid conduit using the rotational data.

15. The method of claim 10 further comprising:

measuring acceleration data using an accelerometer contained in the interior compartment of the at least one sensor device and using the acceleration data with the rotational data from the tri-axial gyroscope to determine direction and radii of one or more bends in the fluid conduit.

16. The method of claim 15, further comprising:

after retrieving the inspection system from the fluid conduit, separating the first and second capsule portions to provide access to a sensor platform in the interior compartment on which the tri-axial gyroscope and the accelerometer are provided.

17. The method of claim 10, wherein the inspection system further comprises a mount assembly configured to removably attach the sensor device to the pig, and wherein the mount assembly is secured to a rear end of the pig.

18. The method of claim 17, further comprising:

attaching the sensor device to the mount assembly prior to inserting the inspection system inside of the fluid conduit.

* * * * *